United States Patent
Okumura

(10) Patent No.: US 11,107,436 B2
(45) Date of Patent: Aug. 31, 2021

(54) IMAGE PROCESSING DEVICE AND IMAGE PROCESSING METHOD

(71) Applicant: SONY INTERACTIVE ENTERTAINMENT INC., Tokyo (JP)

(72) Inventor: Yasushi Okumura, Tokyo (JP)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 0 days.

(21) Appl. No.: 16/093,212

(22) PCT Filed: Feb. 21, 2017

(86) PCT No.: PCT/JP2017/006349
§ 371 (c)(1),
(2) Date: Oct. 12, 2018

(87) PCT Pub. No.: WO2017/183279
PCT Pub. Date: Oct. 26, 2017

(65) Prior Publication Data
US 2019/0172410 A1  Jun. 6, 2019

(30) Foreign Application Priority Data
Apr. 21, 2016  (JP) .............................. JP2016-085545

(51) Int. Cl.
*G09G 5/00* (2006.01)
*G06F 3/01* (2006.01)
(Continued)

(52) U.S. Cl.
CPC ............. *G09G 5/003* (2013.01); *G02B 27/02* (2013.01); *G06F 3/011* (2013.01); *G06F 3/147* (2013.01);
(Continued)

(58) Field of Classification Search
CPC ...... G06F 3/011; G06F 3/012; G06F 3/04815; G09G 2354/00; G09G 2370/022; G09G 5/003; G09G 2370/16
See application file for complete search history.

(56) References Cited

U.S. PATENT DOCUMENTS

2001/0022619 A1 * 9/2001 Nishiwaki .......... H04N 5/23267
348/208.99
2014/0267021 A1 * 9/2014 Lee ........................ G06F 3/0304
345/156
(Continued)

FOREIGN PATENT DOCUMENTS

JP  2007-116309 A  5/2007
JP  2012-257252 A  12/2012
(Continued)

OTHER PUBLICATIONS

International Preliminary Report on Patentability dated Oct. 23, 2018, from International Application No. PCT/JP2017/006349, 15 sheets.
(Continued)

*Primary Examiner* — Kent W Chang
*Assistant Examiner* — Scott Au
(74) *Attorney, Agent, or Firm* — Katten Muchin Rosenman LLP

(57) ABSTRACT

A motion detection section 720 detects a motion exceeding a permissible limit in a wide-viewing-angle image displayed on a head-mounted display 100. A field-of-view restriction processing section 750 restricts a field of view for observing the wide-viewing-angle image in a case in which the motion exceeding the permissible limit has been detected in the wide-viewing-angle image. An image provision section 760 provides, for the head-mounted display 100, the wide-viewing-angle image in which the field of view has been restricted.

7 Claims, 7 Drawing Sheets

(51) Int. Cl.
    *G02B 27/02*     (2006.01)
    *G09G 3/00*     (2006.01)
    *G06F 3/147*     (2006.01)

(52) U.S. Cl.
    CPC ............... *G09G 3/003* (2013.01); *G09G 5/00* (2013.01); *G09G 2354/00* (2013.01)

(56) References Cited

U.S. PATENT DOCUMENTS

| | | | |
|---|---|---|---|
| 2014/0268356 A1* | 9/2014 | Bolas | G02B 27/0093 359/630 |
| 2016/0238852 A1* | 8/2016 | Ellsworth | G02B 27/0179 |
| 2017/0010850 A1* | 1/2017 | Kobayashi | G06F 3/1454 |
| 2017/0255258 A1* | 9/2017 | Feiner | G02B 27/0093 |

FOREIGN PATENT DOCUMENTS

| | | |
|---|---|---|
| JP | 5869177 B1 | 2/2016 |
| JP | 2017-058493 A | 3/2017 |
| JP | 6092437 B1 | 3/2017 |
| JP | 2017-138701 A | 8/2017 |

OTHER PUBLICATIONS

International Search Report and Written Opinion dated May 10, 2017, from International Application No. PCT/JP2017/006349, 10 sheets.

\* cited by examiner

FIG.4
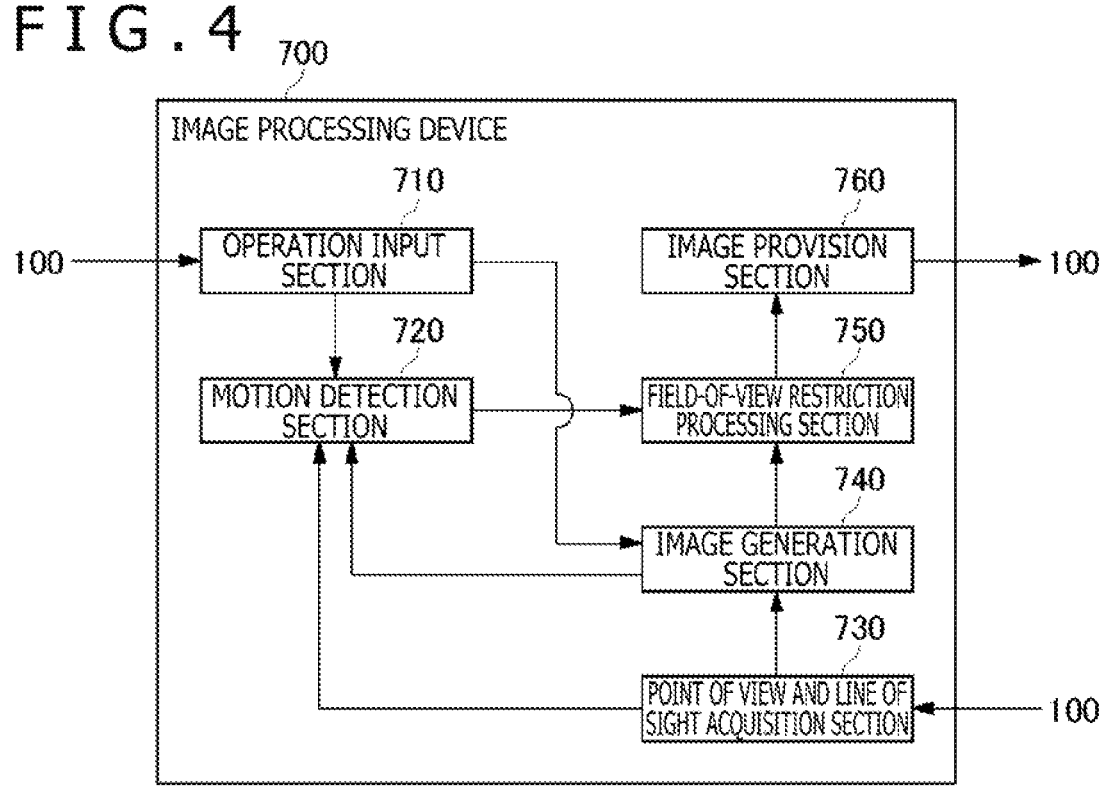
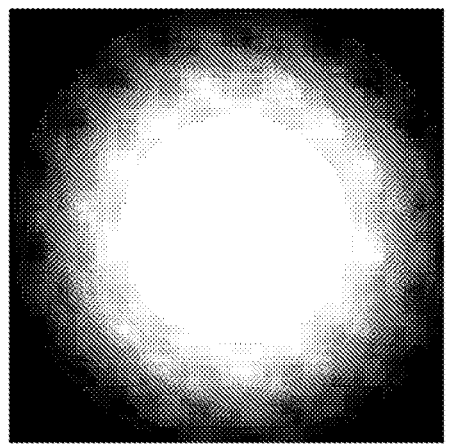
FIG.5

IMAGE PROCESSING DEVICE AND IMAGE PROCESSING METHOD

TECHNICAL FIELD

The present invention relates to a technique for processing an image in a wearable display.

BACKGROUND ART

A system that displays a video on a head-mounted display and such that when a user who wears the head-mounted display rotates his/her head, the video is displayed in accordance with the line-of-sight direction has been developed. By using the head-mounted display, immersion feeling to videos can be raised or operability of application of a game etc. can also be improved.

SUMMARY

Technical Problems

When using a head tracking technique, a video displayed on the head-mounted display can be made to follow the motion of the head. However, when a frame rate of the video is low, the video does not follow the motion of the head sufficiently and "motion sickness" may occur. In addition, in a three-dimensional content, an object in the video may move without relation to the motion of the head or the position of the user himself/herself may move. Even in that case, motion sickness occurs easily. Such a symptom similar to motion sickness that occurs when viewing the three-dimensional content is referred to as "3D motion sickness" or "simulation sickness." When the head-mounted display is worn, it may be difficult to view the three-dimensional content because of such motion sickness.

The present invention has been made in view of the above circumstances. An object of the invention is to provide an image processing technique capable of reducing motion sickness in a wearable display.

Solution to Problems

In order to solve the above problems, an image processing device according to an aspect of the present invention includes a motion detection section configured to detect a motion exceeding a permissible limit in a wide-viewing-angle image displayed on a wearable display device, a field-of-view restriction processing section configured to restrict a field of view for observing the wide-viewing-angle image when the motion exceeding the permissible limit is detected in the wide-viewing-angle image, and an image provision section configured to provide the wide-viewing-angle image in which the field of view is restricted for the wearable display device.

An image processing method according to another aspect of the present invention includes a motion detection step of detecting a motion exceeding a permissible limit in a wide-viewing-angle image displayed on a wearable display device, a field-of-view restriction processing step of restricting a field of view for observing the wide-viewing-angle image when the motion exceeding the permissible limit is detected in the wide-viewing-angle image, and an image provision step of providing the wide-viewing-angle image in which the field of view is restricted for the wearable display device.

Where suitable combinations of the above-described elements or the above expressions of the present invention are converted between different forms such as a method, a device, a system, a computer program, a data structure, and a recording medium, they still constitute effective embodiments of this invention.

Advantageous Effects of Invention

According to the present invention, it is possible to reduce motion sickness in a wearable display.

BRIEF DESCRIPTION OF DRAWINGS

FIG. 4 is a functional configuration diagram of an image processing device according to the present embodiment.

FIG. 5 is a diagram describing an example of a peripheral mask image.

DESCRIPTION OF EMBODIMENT

Figure 1:
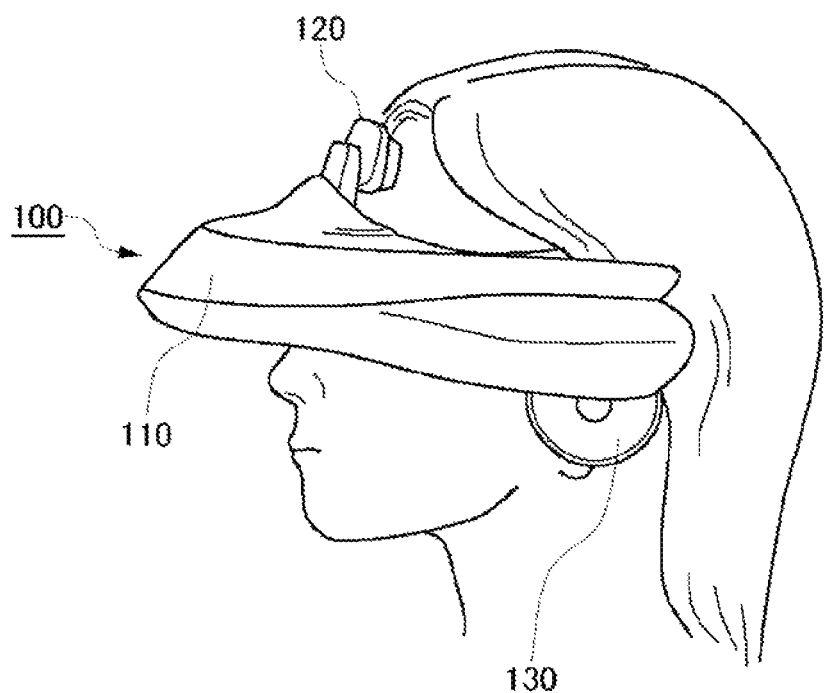
FIG. 1 is an external diagram of a head-mounted display.

FIG. 1 is an external diagram of a head-mounted display 100. The head-mounted display 100 includes a body section 110, a forehead contacting section 120, and a temple contacting section 130.

The head-mounted display 100 is a display device worn by a user on his/her head in such a manner that the user may view still and moving images displayed on a display while listening to sound and music output from headphones.

An attitude sensor incorporated in or externally attached to the head-mounted display 100 permits measurement of attitude information such as a rotation angle and inclination of the user's head wearing the head-mounted display 100.

The head-mounted display 100 is an example of a "wearable display device." In addition to the head-mounted display 100 in a narrowly defined sense, in the wearable display device, there is included an arbitrary wearable display device such as glasses, a glass type display, a glass type camera, headphones, a headset (headphones equipped with a microphone), earphones, earrings, an ear-hanging camera, a hat, a camera-equipped hat, or a hairband.

Figure 2:
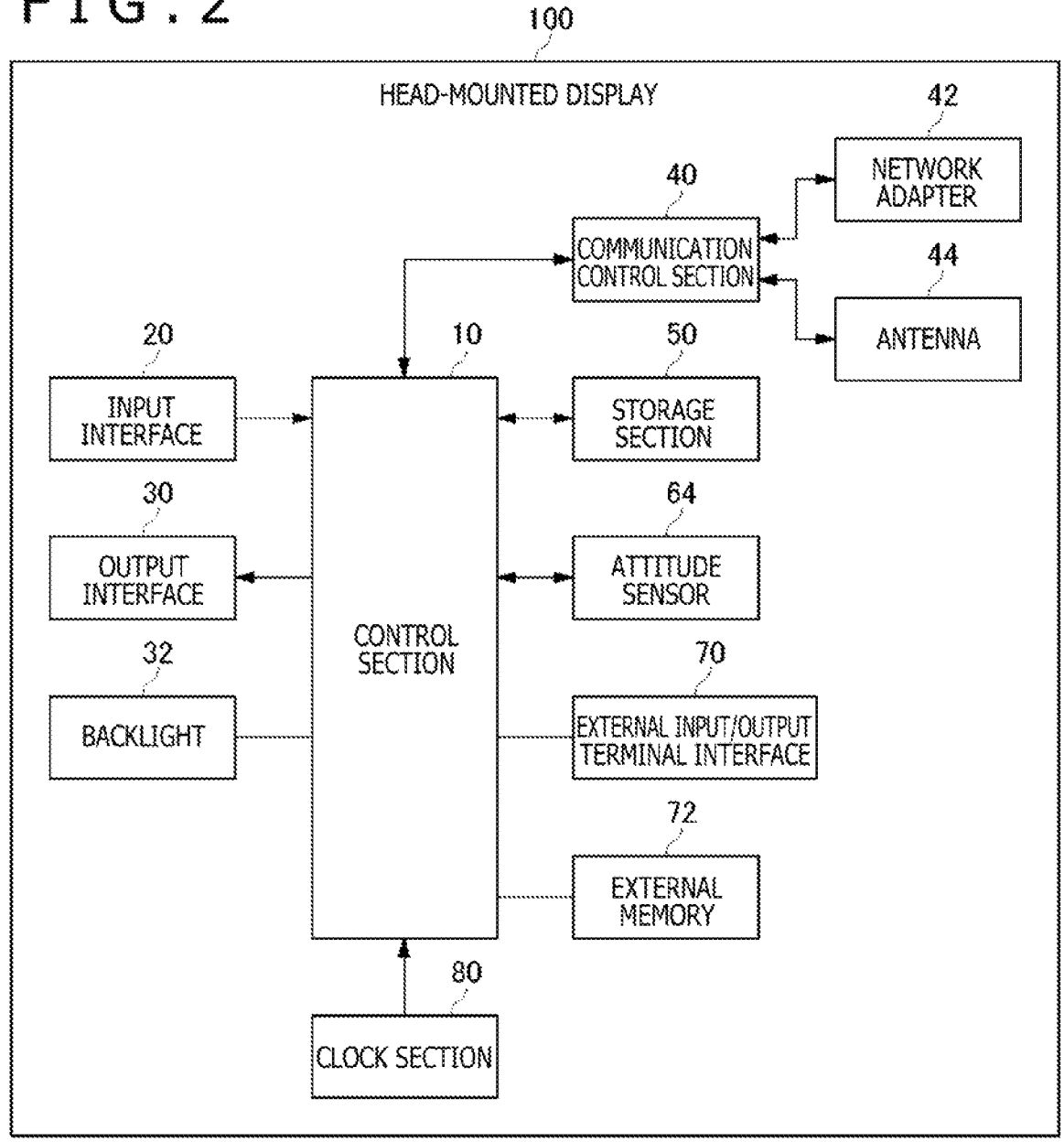
FIG. 2 is a functional configuration diagram of the head-mounted display.

FIG. 2 is a functional configuration diagram of the head-mounted display 100.

A control section 10 is a main processor that processes and outputs signals such as image and sensor signals as well as instructions and data. An input interface 20 receives operating and setting signals from the user and supplies the operating and setting signals to the control section 10. An output interface 30 receives the image signal from the control section 10 and has the image signal displayed on the display. A backlight 32 supplies backlight to a liquid crystal display.

A communication control section 40 transmits data input from the control section 10 to the outside via a network adapter 42 or an antenna 44 in wired or wireless communication. Also, the communication control section 40 receives data from the outside via the network adapter 42 or antenna 44 in wired or wireless communication and outputs the received data to the control section 10.

A storage section 50 temporarily stores data, parameters, operating signals, and the like to be processed by the control section 10.

An attitude sensor 64 detects the attitude information such as the rotation angle and inclination of the body section 110 of the head-mounted display 100. The attitude sensor 64 is implemented by suitably combining a gyro sensor, an acceleration sensor, and an angular acceleration sensor, for example.

An external input/output terminal interface 70 is an interface for connecting peripheral devices such as a universal serial bus (USB) controller. An external memory 72 is an external memory such as a flash memory.

A clock section 80 sets time information on the basis of the setting signals from the control section 10 and supplies time data to the control section 10.

The control section 10 can supply images and text data to the output interface 30 for display on the display, or supply them to the communication control section 40 for transmission to the outside.

Figure 3:
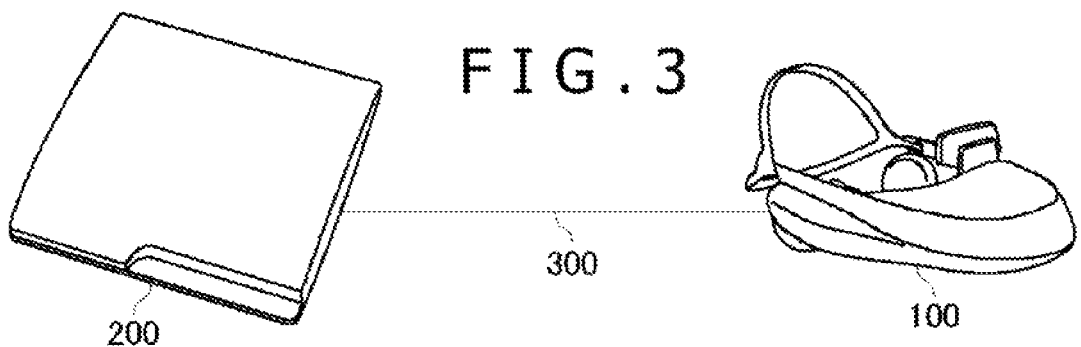
FIG. 3 is a configuration diagram of an image processing system according to the present embodiment.

FIG. 3 is a configuration diagram illustrating an image processing system according to the present embodiment. The head-mounted display 100 is connected to a game device 200 via an interface 300 that connects a peripheral device, such as a wireless communication or USB. The game device 200 may be further connected to a server via a network. In that case, the server may provide for the game device 200 an on-line application of games, etc. in which a plurality of users can participate via the network. The head-mounted display 100 may be connected to a computer or mobile terminal in place of the game device 200.

A wide-viewing-angle image displayed on the head-mounted display 100 may be an artificial three-dimensional image as in a game space in addition to a previously photographed three-dimensional video of a full celestial sphere. In addition, the wide-viewing-angle image may be a live video at remote locations distributed via the network.

FIG. 4 is a functional configuration diagram illustrating an image processing device 700 according to the present embodiment. FIG. 4 depicts the blocks aiming at the functions. These functional blocks may be implemented variously by hardware alone, by software alone, or by combinations of both.

The image processing device 700 is mounted in the game device 200 to which the head-mounted display 100 is connected. Alternatively, at least a part of the functions of the image processing device 700 may be implemented in the control section 10 of the head-mounted display 100. As another alternative, at least a part of the functions of the image processing device 700 may be implemented in the server connected to the game device 200 via the network.

An operation input section 710 acquires an operation instruction of the user via the input interface 20 of the head-mounted display 100 or the controller connected to the game device 200 by wire or wirelessly. Examples of the operation instruction include an instruction to zoom in or zoom out an image displayed on the head-mounted display 100, an instruction to move in a virtual space, an instruction to warp to another virtual space, an operation instruction to some sort of icon of giving a particular effect to images, and the like. The operation instruction acquired by the operation input section 710 is supplied to a motion detection section 720 and an image generation section 740.

A point of view and line of sight acquisition section 730 acquires a point-of-view position and line-of-sight direction of the user who wears the head-mounted display 100 on the basis of the attitude information detected by the attitude sensor 64 of the head-mounted display 100.

The image generation section 740 acquires information regarding the point-of-view position and line-of-sight direction of the head-mounted display 100 from the point of view and line of sight acquisition section 730. Further, the image generation section 740 generates an image viewed in the line-of-sight direction from the point-of-view position as the wide-viewing-angle image displayed on the head-mounted display 100. Through this process, when the user who wears the head-mounted display 100 moves the head, the wide-viewing-angle image displayed on the head-mounted display 100 can be made to follow the motion of the head. In general, this is a technique that is referred to as "head tracking."

When an operation instruction to zoom in or zoom out is received from the operation input section 710, the image generation section 740 enlarges or reduces the wide-viewing-angle image at an instructed scale factor.

Here, the wide-viewing-angle image displayed on the head-mounted display 100 is an image having a wide view angle as in the entire periphery image or a panoramic image. Further, the wide-viewing-angle image may be a moving image or a still image, or may be a rendered computer graphics.

The image generation section 740 gives the generated wide-viewing-angle image to a field-of-view restriction processing section 750.

The motion detection section 720 detects a motion exceeding a permissible limit in the wide-viewing-angle image generated by the image generation section 740. Here, the permissible limit indicates a degree in which motion sickness is prevented from occurring in the user who observes the wide-viewing-angle image in the head-mounted display 100. In particular, when the motion occurring in the wide-viewing-angle image is not related to a physical motion of the user, the motion exceeds the permissible limit and motion sickness occurs in the user who observes the wide-viewing-angle image.

The motion detection section 720 receives the operation instruction from the operation input section 710 and determines whether or not a motion exceeding the permissible limit occurs in the wide-viewing-angle image by the operation instruction. For example, if there is received an operation instruction to zoom in or zoom out at a predetermined scale factor or more or an operation instruction to move in the virtual space at a predetermined speed or more, the motion detection section 720 determines that the motion exceeding the permissible limit occurs in the wide-viewing-angle image. In addition, if there is received an operation instruction to give an effect in which a large change is brought into the wide-viewing-angle image displayed on the head-mounted display 100, the motion detection section 720 determines that the motion exceeding the permissible limit occurs in the wide-viewing-angle image.

Further, the motion detection section 720 detects a motion vector of a characteristic point on the basis of a difference between frames in the wide-viewing-angle image generated by the image generation section 740. If a size of the motion vector exceeds a predetermined threshold, the motion detection section 720 determines that the motion exceeding the permissible limit occurs. As a frame rate in the wide-viewing-angle image generated by the image generation section 740 becomes lower, a threshold at the time when the motion detection section 720 determines the size of the motion vector may be made small. The reason is that as the frame rate in the wide-viewing-angle image is lower, motion sickness occurs more easily. The motion detection section 720 may determine whether or not a motion occurs in the wide-viewing-angle image without relation to the physical motion such as an attitude change or physical movement of the user. The reason is that motion sickness occurs easily when a motion occurs in the wide-viewing-angle image independently of the physical motion.

In addition, when a change amount in the point-of-view position or the line-of-sight direction acquired by the point of view and line of sight acquisition section 730 exceeds a threshold determined depending on the frame rate in the wide-viewing-angle image generated by the image generation section 740, the motion detection section 720 determines that the motion exceeding the permissible limit occurs. As the frame rate in the wide-viewing-angle image becomes lower, the threshold as compared with the change amount in the point-of-view position or the line-of-sight direction may be made smaller. The reason is that even if the head tracking is performed and an image is made to follow a change in the point of view or the line of sight, as the frame rate in the wide-viewing-angle image becomes lower, the following is more insufficient and motion sickness occurs more easily. For example, when the user performs a motion such as squatting, the change amount in the point-of-view position or the line-of-sight direction becomes large and motion sickness occurs easily at a low frame rate.

When the motion exceeding the permissible limit is detected in the wide-viewing-angle image by the motion detection section 720, the motion detection section 720 gives an instruction to restrict a field of view to the field-of-view restriction processing section 750.

In accordance with a field-of-view restriction instruction from the motion detection section 720, the field-of-view restriction processing section 750 restricts the field of view for observing the wide-viewing-angle image generated by the image generation section 740 and gives the wide-viewing-angle image in which the field of view is restricted to an image provision section 760. When the field-of-view restriction instruction is not received from the motion detection section 720, the field-of-view restriction processing section 750 directly gives the wide-viewing-angle image generated by the image generation section 740 to the image provision section 760.

The field-of-view restriction processing is realized, for example, by processing to mask at least a part (e.g., a peripheral area) of the wide-viewing-angle image generated by the image generation section 740, by processing to blur the wide-viewing-angle image, or by combinations of both. As long as the processing is processing for restricting the field of view of the user for observing the wide-viewing-angle image in some manner, the field-of-view restriction processing is not limited to the processing mentioned above.

If the motion exceeding the permissible limit is detected, the image provision section 760 provides the wide-viewing-angle image in which the field of view is restricted by the field-of-view restriction processing section 750 for the head-mounted display 100. If the motion exceeding the permissible limit is not detected, the image provision section 760 provides the wide-viewing-angle image in which the field of view is not restricted for the head-mounted display 100.

FIG. 5 is a diagram describing an example of a peripheral mask image. As one example, the peripheral mask image in FIG. 5 is a mask image in which a color of a periphery of the image is black and transparency is increased toward the center, and that is completely transparent at the center. When the periphery of the wide-viewing-angle image is to be masked, the field-of-view restriction processing section 750 superimposes the peripheral mask image on the wide-viewing-angle image. Through this process, the periphery of the wide-viewing-angle image is painted black to be invisible, and the transparency is increased toward the center and in the result the original image can be observed. As another example, the peripheral mask image in which the transmittance is not changed toward the center may be used. The color of the peripheral mask image may be a color other than a black color.

In addition to the field-of-view restriction processing, blurring processing is used. The blurring processing may be applied to the whole wide-viewing-angle image so as to make details thereof invisible, and the blurring processing may be applied to only the peripheral area of the wide-viewing-angle image. Alternatively, the periphery of the wide-viewing-angle image is masked in a black color and then the blurring processing may be applied to the wide-viewing-angle image.

Figure 6A:
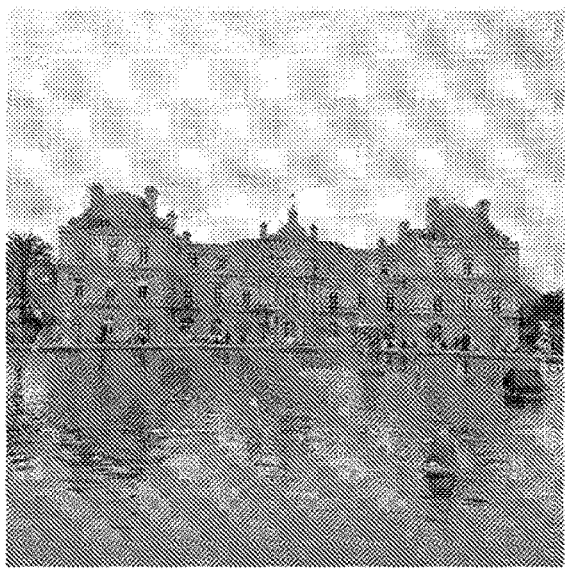
FIG. 6A is a diagram describing an appearance in which an image displayed on the head-mounted display is zoomed in and observed.
Figure 6B:
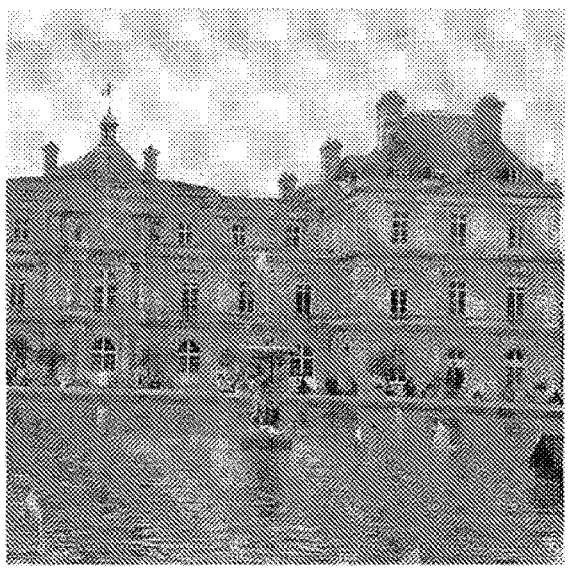
FIG. 6B is a diagram describing an appearance in which the image displayed on the head-mounted display is zoomed in and observed.
Figure 6C:
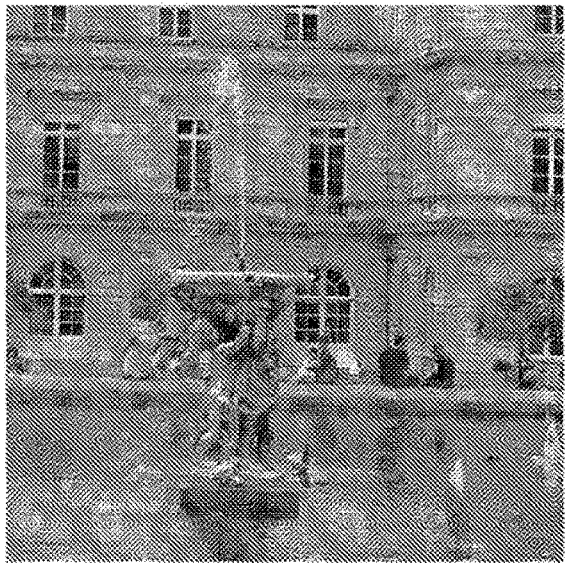
FIG. 6C is a diagram describing an appearance in which the image displayed on the head-mounted display is zoomed in and observed.

FIGS. 6A to 6C are diagrams describing an appearance in which the image displayed on the head-mounted display 100 is zoomed in and observed. FIG. 6A illustrates an image displayed in the case in which a sight is viewed remotely. When the user performs a zoom-in operation to the image, an enlarged image in FIG. 6C is finally displayed through an image in FIG. 6B. When the zoom-in operation is performed as in FIGS. 6A to 6C while observing the wide-viewing-angle image by the head-mounted display 100, a field of vision changes rapidly and therefore motion sickness occurs. To solve the above problem, between the start of the zoom-in operation and the completion thereof, the field-of-view restriction processing section 750 superimposes the peripheral mask image in FIG. 5 on the wide-viewing-angle image displayed on the head-mounted display 100 and temporarily narrows the field of view.

Figure 7:
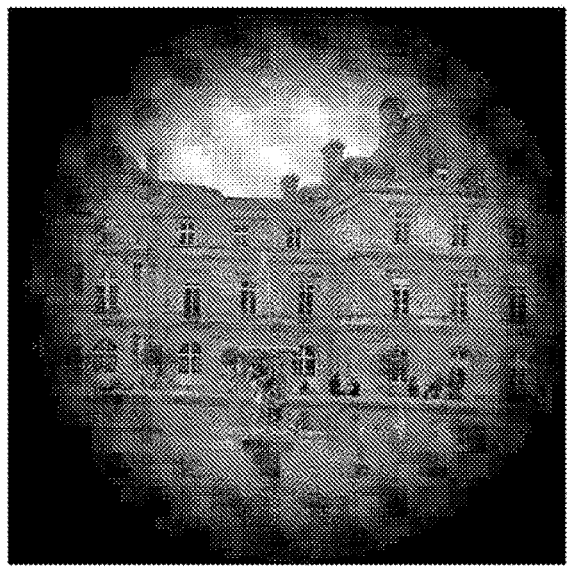
FIG. 7 is a diagram describing a wide-viewing-angle image on which the peripheral mask image in FIG. 5 is superimposed.

FIG. 7 is a diagram describing the wide-viewing-angle image on which the peripheral mask image in FIG. 5 is superimposed. During the Zoom-in operation, the periphery of the wide-viewing-angle image is painted black by the peripheral mask image and the field of view of the user is temporarily narrowed. Therefore, even if the motion rapidly occurs in the field of vision, motion sickness is reduced.

When a zoom-in mode is entered, the peripheral mask image may be superimposed on the wide-viewing-angle image immediately and when the zoom-in mode is quitted, the peripheral mask image may be erased. Alternatively, transmittance of the peripheral mask image superposed on the wide-viewing-angle image may be varied and the transmittance from the start of the zoom-in mode to the completion thereof may be varied from 100% to 0% gradually. Further, as the zoom-in operation advances, an erasing amount by the peripheral mask image may be increased gradually. In addition, as another method, an area of the transparent central part of the peripheral mask image may be varied and as the zoom-in operation advances, the transparent central part may be narrowed.

Figure 8A:
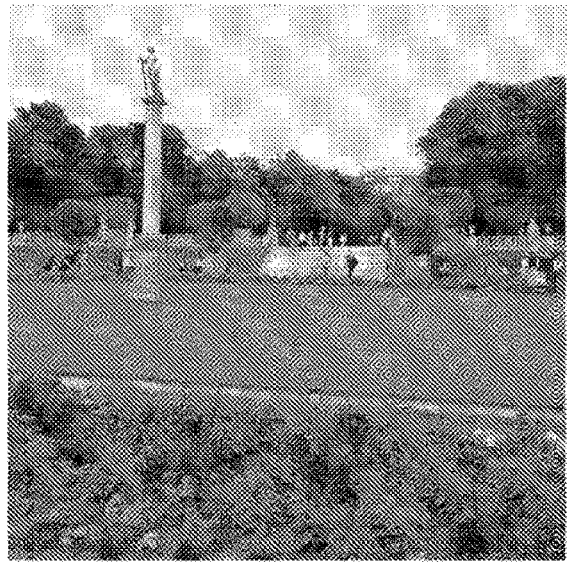
FIG. 8A is a diagram describing an appearance in which a user walks through virtually in a space displayed on the head-mounted display.
Figure 8B:
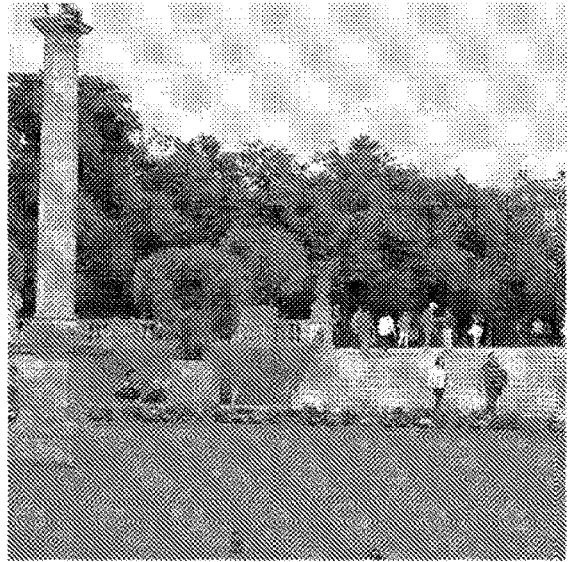
FIG. 8B is a diagram describing an appearance in which the user walks through virtually in the space displayed on the head-mounted display.
Figure 8C:
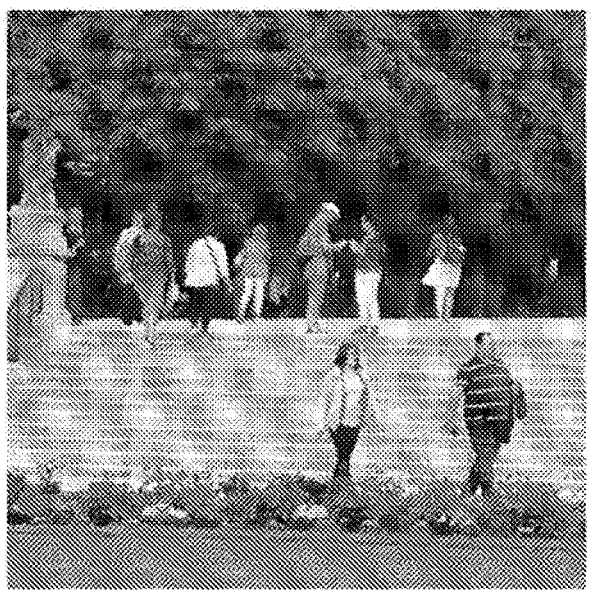
FIG. 8C is a diagram describing an appearance in which the user walks through virtually in the space displayed on the head-mounted display.

FIGS. 8A to 8C are diagrams describing an appearance in which the user walks through virtually in a space displayed on the head-mounted display 100. As illustrated in FIG. 8A, the user is assumed to be in front of the grass in a park. From there, the user is assumed to walk across the grass in the park and approach stairs viewed on the other side of the grass. FIG. 8B illustrates an image observed on the way of crossing the grass in the park and FIG. 8C illustrates an image observed at the time when the user comes to the stairs on the other side of the grass. As described above, when the user virtually moves in a three-dimensional space displayed on the head-mounted display 100, the field of vision largely changes, and therefore motion sickness may occur. In particular, in the case of moving at high speed, motion sickness occurs easily. To solve the above problem, while the user moves, the field-of-view restriction processing section 750 superimposes the peripheral mask image in FIG. 5 on the wide-viewing-angle image displayed on the head-mounted display 100 and narrows the field of view temporarily.

Figure 9:
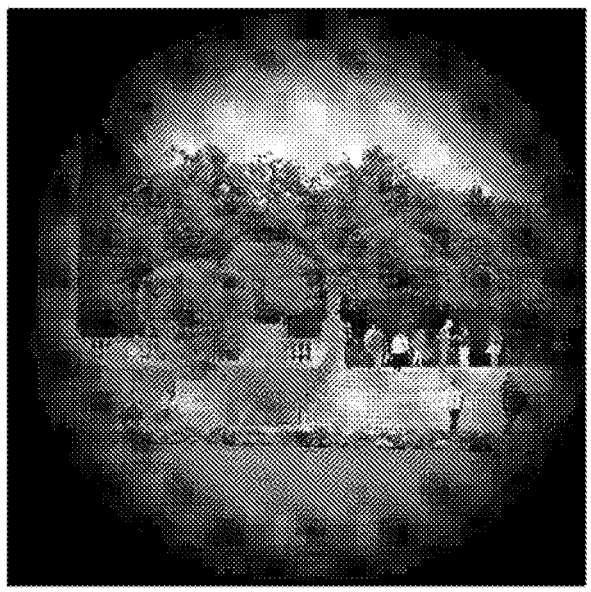
FIG. 9 is a diagram describing a wide-viewing-angle image on which the peripheral mask image in FIG. 5 is superimposed.

FIG. 9 is a diagram describing the wide-viewing-angle image on which the peripheral mask image in FIG. 5 is superimposed. While the user moves, the periphery of the wide-viewing-angle image is painted black by the peripheral mask image and the field of view of the user is temporarily narrowed. Therefore, even if the motion occurs rapidly in the field of vision, motion sickness is reduced.

The erasing amount by the peripheral mask image can be adjusted in accordance with the transmittance of the peripheral mask image and the area of the transparent central part of the peripheral mask image. As the user moves more, the erasing amount by the peripheral mask image may be made larger. Further, at the start and end of the movement, the erasing amount may be made small relatively and, while the user moves, may be made large relatively. Alternatively, as the speed of the movement is increased, the erasing amount may be made larger.

In addition to a case of zooming in, zooming out, walking through, or the like, the restriction of the field of view by using the peripheral mask image can be applied to even a case in which the field of vision is rotated in the horizontal direction (rotated around a Y-axis) by a controller operation. The reason is that even if the field of vision changes rapidly by using the controller operation, motion sickness occurs easily.

A method for restricting the field of view by the field-of-view restriction processing section 750 can be considered variously in addition to peripheral mask processing. For example, processing for blurring the entire image or processing for blurring the periphery of an image may be applied. Alternatively, the processing for blurring an image may be combined with the peripheral mask processing. Luminance of images may be reduced or resolution of images may be reduced. When the field of view is narrowed or visibility of the field of vision is restricted in some manner, motion sickness is reduced.

Further, when the head-mounted display 100 is a video transmission type head-mounted display, an image photographed by a camera attached to the head-mounted display 100 may be displayed on the peripheral area to be masked. An external state is reflected on the peripheral area, and therefore a reduction effect of motion sickness is exerted.

Figure 10:
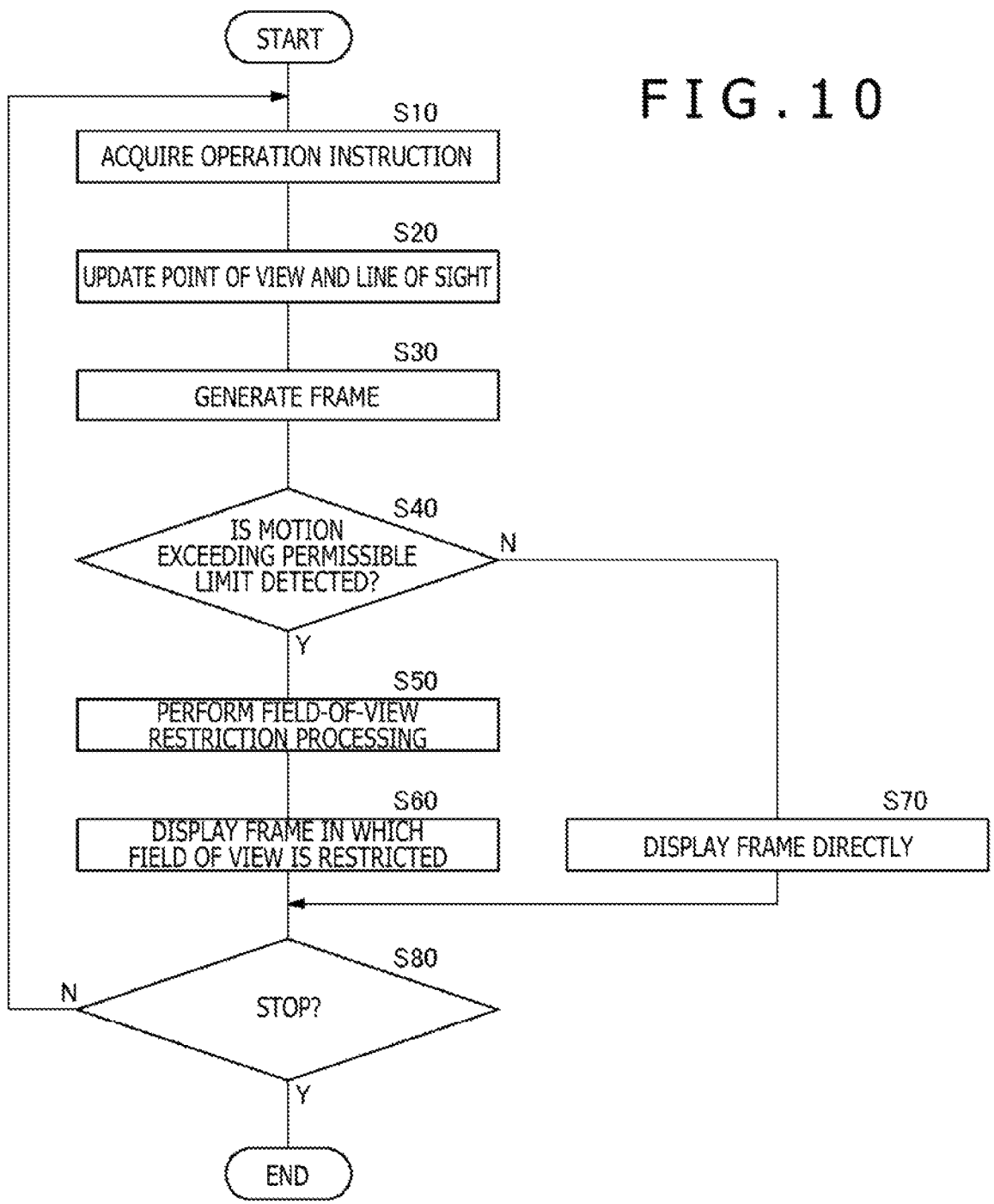
FIG. 10 is a flowchart illustrating a procedure for field-of-view restriction processing of a wide-viewing-angle image by the image processing device according to the present embodiment.

FIG. 10 is a flowchart illustrating a procedure for the field-of-view restriction processing of the wide-viewing-angle image by the image processing device 700 according to the present embodiment.

The operation input section 710 acquires an operation instruction from the user who wears the head-mounted display 100 (S10). In accordance with the head tracking, the point of view and line of sight acquisition section 730 acquires and updates the current point-of-view position and line-of-sight direction of the user who wears the head-mounted display 100 (S20). Even when the operation input section 710 receives an instruction of movement in the virtual space, the point-of-view position and line-of-sight direction of the user in the virtual space are updated.

The image generation section 740 generates an image viewed in the current line-of-sight direction from the current point-of-view position of the user as a frame of the wide-viewing-angle image displayed on the head-mounted display 100 (S30). When an instruction of zoom operation is received from the operation input section 710, the image generation section 740 enlarges or reduces the frame at the instructed scale factor.

The motion detection section 720 detects the presence or absence of the motion exceeding the permissible limit in the wide-viewing-angle image displayed on the head-mounted display 100 (S40). When an operation input such as zooming or warping is performed, when a predetermined size or more of motion is detected in the wide-viewing-angle image independently of an attitude change or physical movement of the user who wears the head-mounted display 100, or the like, the motion detection section 720 determines that the motion exceeding the permissible limit is detected.

If the motion exceeding the permissible limit is not detected (N at S40), the image provision section 760 directly provides the frame generated by the image generation section 740 for the head-mounted display 100 and allows the head-mounted display 100 to display the above frame (S70).

When the motion exceeding the permissible limit is detected (Y at S40), the field-of-view restriction processing section 750 applies processing for restricting the field of view to the frame generated by the image generation section 740 (S50). The field-of-view restriction processing section 750 applies, for example, processing for masking the periphery of the frame generated by the image generation section 740 or processing for blurring the entire frame or the frame periphery to the above frame. The image provision section 760 provides the frame in which the field of view is restricted by the field-of-view restriction processing section 750 for the head-mounted display 100 and allows the head-mounted display 100 to display the above frame (S60).

If a display of the image is stopped on the head-mounted display 100 (Y at S80), a series of processes are ended. If the display of the image is continued on the head-mounted display 100 (N at S80), the process returns to step S10 and the processes thereafter are repeated.

The present invention has been described on the basis of the embodiment. The embodiment is illustrative, and it can be recognized by those skilled in the art that various modifications are possible in regard to suitable combinations of the components and the processes of the embodiment and that also such modifications fall within the scope of the present invention. Such modifications are described.

The head-mounted display 100 may be a video transmission type. When the video transmission type head-mounted display 100 is worn, the user cannot view the state of the outside but an image of the outside photographed by a camera is reflected on a display. When a photographed image of the outside is the wide-viewing-angle image as in the entire periphery image, the field-of-view restriction processing according to the present embodiment may be used to thereby reduce motion sickness. In particular, when a frame rate of an outside video is low, motion sickness occurs easily and therefore the field-of-view restriction processing such as the peripheral mask processing is effective.

When the head-mounted display 100 receives images via a network, a transmission delay occurs and therefore the frame rate of the image displayed on the head-mounted display 100 becomes low. When the wide-viewing-angle image having the low frame rate is observed under such a condition, motion sickness occurs easily. The field-of-view restriction processing according to the present embodiment is effective even in such a case.

REFERENCE SIGNS LIST

10 Control section, 20 Input interface, 30 Output interface, 32 Backlight, 40 Communication control section, 42 Network adapter, 44 Antenna, 50 Storage section, 64 Attitude sensor, 70 External input/output terminal interface, 72 External memory, 80 Clock section, 100 Head-mounted display, 110 Body section, 120 Forehead contacting section, 130 Temple contacting section, 200 Game device, 700 Image processing device, 710 Operation input section, 720 Motion detection section, 730 Point of view and line of sight acquisition section, 740 Image generation section, 750 Field-of-view restriction processing section, 760 Image provision section

INDUSTRIAL APPLICABILITY

The present invention can be applied to a technique for processing an image in a wearable display.

The invention claimed is:

1. An image processing device comprising:
a motion detection section configured to detect a motion exceeding a permissible limit in a wide-viewing-angle image displayed on a wearable display device;
a field-of-view restriction processing section configured to restrict a field of view for observing the wide-viewing-angle image when the motion exceeding the permissible limit is detected in the wide-viewing-angle image; and
an image provision section configured to provide the wide-viewing-angle image in which the field of view is restricted for the wearable display device,
wherein the field-of-view restriction processing section restricts the field of view for observing the wide-viewing-angle image by using processing for masking a peripheral area of the wide-viewing-angle image,
wherein transmittance of the masking is decreased from 100% to 0% over a predetermined time period,
wherein, when receiving an operation instruction to zoom in or zoom out the wide-viewing-angle image beyond a predetermined scale factor, the motion detection section determines that the motion exceeding the permissible limit is detected and the field of view is restricted for a duration of the operation instruction, and
wherein, when a motion that does not depend on a physical motion of a user is detected in the wide-viewing-angle image, the motion detection section determines that the motion exceeding the permissible limit is detected and the wide-viewing-angle image is masked.

2. The image processing device according to claim 1, wherein
when receiving an operation instruction to move a viewpoint position in a virtual space displayed on the wearable display device beyond a predetermined speed, the motion detection section determines that the motion exceeding the permissible limit is detected,
wherein the operation instruction is received using a handheld controller.

3. The image processing device according to claim 1, wherein
when a change amount in a point-of-view position exceeds a first predetermined threshold and a frame rate is below a second predetermined threshold, the motion detection section determines that the motion exceeding the permissible limit is detected and the wide-viewing-angle image is masked.

4. An image processing method comprising:
detecting a motion exceeding a permissible limit in a wide-viewing-angle image displayed on a wearable display device;
restricting a field of view for observing the wide-viewing-angle image when receiving an operation instruction to zoom in or zoom out the wide-viewing-angle image beyond a predetermined scale factor for a duration of the operation instruction; and
providing the wide-viewing-angle image in which the field of view is restricted for the wearable display device,
wherein the masking includes making the peripheral area black and transparency of the masking is increased towards a center of the wide-viewing-angle image; and
when receiving an operation instruction to zoom in or zoom out the wide-viewing-angle image beyond a predetermined scale factor from a fixed viewpoint, the motion detection section determines that the motion exceeding the permissible limit is detected and the field of view is restricted for a duration of the operation instruction, and
when a motion that does not depend on a physical motion of a user is detected in the wide-viewing-angle image, it is determined that the motion exceeding the permissible limit is detected and the wide-viewing-angle image is masked.

5. A non-transitory computer readable medium having stored thereon a program for a computer, the program comprising:
by a motion detection section, detecting a motion exceeding a permissible limit in a wide-viewing-angle image displayed on a wearable display device;
by a field-of-view restriction processing section, restricting a field of view for observing the wide-viewing-angle image when receiving an operation instruction to zoom in or zoom out the wide-viewing-angle image beyond a predetermined scale factor for a duration of the operation instruction; and by an image provision section, providing the wide-viewing-angle image in which the field of view is restricted for the wearable display device, wherein the masking includes making the peripheral area black and transparency of the masking is increased towards a center of the wide-viewing-angle image, and wherein, when a motion that does not depend on a physical motion of a user is detected in the wide-viewing-angle image, the motion detection section determines that the motion exceeding the permissible limit is detected and the wide-viewing-angle image is masked.

6. An image processing device comprising:

a motion detection section configured to detect a motion exceeding a permissible limit in a wide-viewing-angle image displayed on a wearable display device;

a field-of-view restriction processing section configured to restrict a field of view for observing the wide-viewing-angle image when the motion exceeding the permissible limit is detected in the wide-viewing-angle image; and an image provision section configured to provide the wide-viewing-angle image in which the field of view is restricted for the wearable display device, wherein the field-of-view restriction processing section restricts the field of view for observing the wide-viewing-angle image by using processing for masking a peripheral area of the wide-viewing-angle image, wherein transmittance of the masking is decreased from 100% to 0% over a predetermined time period, wherein, when receiving an operation instruction to move a viewpoint position in a virtual space displayed on the wearable display device beyond a predetermined speed, the motion detection section determines that the motion exceeding the permissible limit is detected and the field-of-view restriction processing section, wherein, when a motion that does not depend on a physical motion of a user is detected in the wide-viewing-angle image, the motion detection section determines that the motion exceeding the permissible limit is detected and the wide-viewing-angle image is masked, and wherein the operation instruction is received using a handheld controller.

7. An image processing device comprising:

a motion detection section configured to detect a motion exceeding a permissible limit in a wide-viewing-angle image displayed on a wearable display device;

a field-of-view restriction processing section configured to restrict a field of view for observing the wide-viewing-angle image when the motion exceeding the permissible limit is detected in the wide-viewing-angle image; and an image provision section configured to provide the wide-viewing-angle image in which the field of view is restricted for the wearable display device, wherein the field-of-view restriction processing section restricts the field of view for observing the wide-viewing-angle image by using processing for masking a peripheral area of the wide-viewing-angle image, wherein transmittance of the masking is decreased from 100% to 0% over a predetermined time period, wherein, when a change amount in a point-of-view position exceeds a first predetermined threshold and a frame rate is below a second predetermined, the motion detection section determines that the motion exceeding the permissible limit is detected and the wide-viewing-angle image is masked, and wherein, when a motion that does not depend on a physical motion of a user is detected in the wide-viewing-angle image, the motion detection section determines that the motion exceeding the permissible limit is detected and the wide-viewing-angle image is masked.

* * * * *